(12) United States Patent
Homan et al.

(10) Patent No.: US 6,516,621 B2
(45) Date of Patent: Feb. 11, 2003

(54) AIR CONDITIONER FOR HYBRID VEHICLE

(75) Inventors: Toshinobu Homan, Obu (JP); Yuji Takeo, Toyoake (JP); Mitsuyo Oomura, Hekinan (JP); Hiroki Nakamura, Chiryu (JP); Tadashi Nakagawa, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/047,671

(22) Filed: Jan. 15, 2002

(65) Prior Publication Data

US 2002/0104324 A1 Aug. 8, 2002

(30) Foreign Application Priority Data

Jan. 16, 2001 (JP) ........................................ 2001-007849

(51) Int. Cl.7 ................................................. B60H 1/32
(52) U.S. Cl. ............................... 62/133; 62/243; 62/244
(58) Field of Search .......................... 62/133, 229, 243, 62/244

(56) References Cited

U.S. PATENT DOCUMENTS

| | | | | |
|---|---|---|---|---|
| 5,275,011 A | * | 1/1994 | Hanson et al. ................. 62/229 |
| 5,533,353 A | * | 7/1996 | Baker et al. .................... 62/229 |
| 5,802,861 A | * | 9/1998 | Yamashita et al. ............. 62/133 |
| 5,867,996 A | * | 2/1999 | Takano et al. ................. 62/175 |
| 5,968,171 A | * | 10/1999 | Sunaga et al. ................. 62/133 |
| 5,987,905 A | * | 11/1999 | Nonoyama et al. ........... 62/133 |
| 5,992,156 A | * | 11/1999 | Isobe et al. .................... 32/133 |
| 6,393,849 B1 | * | 5/2002 | Takenaka et al. ............. 62/133 |

* cited by examiner

Primary Examiner—William E. Tapolcai
Assistant Examiner—Mohammad M. Ali
(74) Attorney, Agent, or Firm—Harness, Dickey & Pierce, PLC

(57) ABSTRACT

In a hybrid vehicle including an engine and an electric motor both for running the vehicle, an air conditioner includes a compressor driven by the engine, and an engine controller controls the operation of the engine based on a condition of the air conditioner and a condition of the vehicle except the air conditioner. While the air conditioner performs a defrosting control for a windshield, the engine controller drives the engine irrespective of the condition of the vehicle except the air conditioner. On the other hand, when the defrosting control is not performed, the operation of the engine is controlled in accordance with the condition of the vehicle, for example.

16 Claims, 8 Drawing Sheets

AIR CONDITIONER FOR HYBRID VEHICLE

CROSS-REFERENCE TO RELATED APPLICATION

This application is related to and claims priority from Japanese Patent Application No. 2001-7849 filed on Jan. 16, 2001, the content of which is hereby incorporated by reference.

BACKGROUND OF THE INVENTION

1. Field of the Invention

The present invention relates to an air conditioner for a hybrid vehicle having an engine and an electric motor for running the vehicle.

2. Description of Related Art

In a conventional hybrid vehicle having an engine and an electric motor for running the vehicle, a compressor of an air conditioner is driven by the engine, and the engine is automatically stopped in a predetermined vehicle condition such as when the vehicle is stopped and when a vehicle speed is reduced, irrespective of the operation condition of the air conditioner. However, in the hybrid vehicle, even when a vehicle windshield is defrosted, the engine is stopped in the predetermined vehicle condition, and a defrosting function cannot be obtained.

On the contrary, if the engine is continuously operated for obtaining the defrosting function, fuel consumption efficiency is decreased.

SUMMARY OF THE INVENTION

In view of the above problems, it is an object of the present invention to provide an air conditioner for a hybrid vehicle having an engine and an electric motor, both for running the vehicle, which improves both of defrosting performance for a windshield and fuel consumption performance.

According to the present invention, an air conditioner for a hybrid vehicle includes a compressor driven by an engine of the vehicle, a cooling heat exchanger for cooling and dehumidifying air to be blown into a passenger compartment by an operation of the compressor, and a control unit for controlling the operation of the compressor. The control unit outputs an air-conditioning preference signal for requiring to drive the engine irrespective of a condition of the vehicle, to an engine controller of the vehicle, in a defrosting control where air cooled and dehumidified by the cooling heat exchanger is blown toward a windshield of the vehicle. Accordingly, in the defrosting control, the engine is driven, and the compressor can be driven by the engine. Therefore, in the defrosting control, defrosting function can be always obtained irrespective of the condition of the vehicle. That is, the engine controller drives the engine irrespective of the condition of the vehicle when the engine controller receives the air-conditioning preference signal from the control unit.

On the other hand, when the defrosting control is not performed, the control of the engine can be performed based on the condition of the vehicle. Therefore, for example, while the vehicle is stopped, the engine is stopped, thereby improving fuel consumption efficiency.

Preferably, the defrosting control is performed when a relative humidity on an inner surface of the windshield becomes equal to or higher than a predetermined value. Therefore, when the relative humidity on the inner surface of the windshield becomes equal to or higher than the predetermined value, the engine is driven irrespective of the condition of the vehicle. Accordingly, the humidity in the passenger compartment can be readily controlled irrespective of the condition of the vehicle.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings.

In the embodiment, the present invention is typically applied to an automatic air conditioner. In the automatic air conditioner, an air conditioning unit 6 for performing an air-conditioning operation in a passenger compartment of a hybrid vehicle 5 is provided, and each of air-conditioning components (actuators) of the air conditioning unit 6 is controlled by an air-conditioning controller (air-conditioning ECU) 7, so that the automatic air conditioner always automatically controls the temperature of the passenger compartment to a set temperature.

Figure 1:
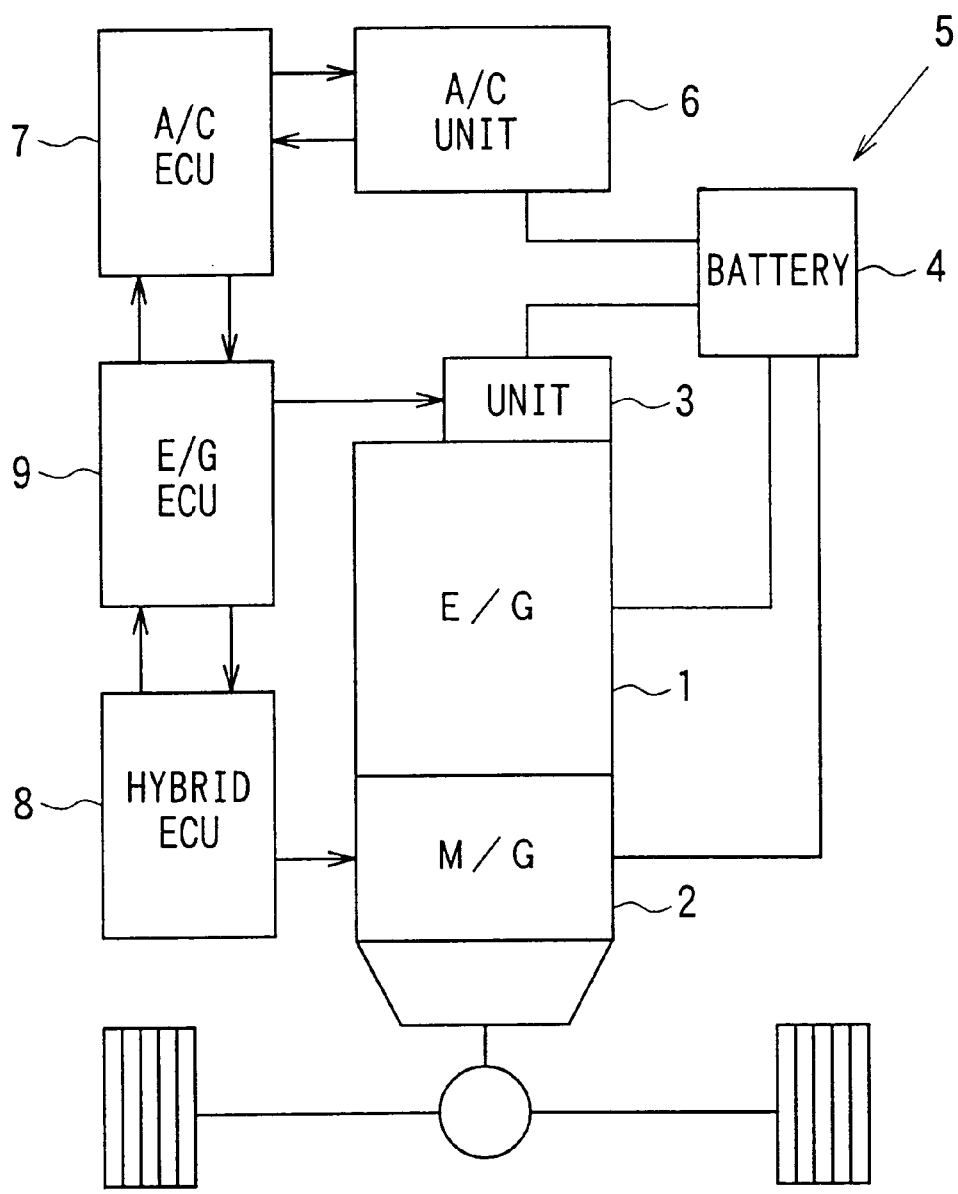
FIG. 1 is a schematic diagram showing a hybrid vehicle according to a preferred embodiment of the present invention.

As shown in FIG. 1, the vehicle 5 includes an engine (internal combustion engine, e.g., gasoline engine) 1 for running the vehicle 5, an electric motor 2 for running the vehicle 5, an engine-starting unit 3, a battery (e.g., nickel-hydrogen storage battery) 4 and a generator (not shown). The engine-starting unit 3, for starting operation of the engine 1, includes a start motor and an ignition unit, and the battery 4 supplies electric power to the electric motor 2 and the engine-starting unit 3. The generator is driven by the engine 1 to charge the battery 4.

The engine 1 is detachably engaged with a vehicle shaft, and the electric motor 2 is also detachably engaged with the vehicle shaft. Further, the electric motor 2 is engaged with the vehicle shaft when the engine 1 is disengaged with the vehicle shaft. The electric motor 2 is constructed to be automatically controlled (e.g., inverter control) by a hybrid controller (hybrid ECU) 8. The engine-starting unit 3 is constructed to be automatically controlled by an engine controller (engine ECU) 9 so that the combustion efficiency of the engine 1 is made maximum. The engine ECU 9 drives the engine 1 by controlling electrical power supplied to the engine-starting unit 3, when large driving force is required to run the vehicle 5 (high-load running mode), or when a compressor 41 of the air conditioner is driven or when the battery 4 is required to be charged. The engine ECU 9 controls the operation state of the engine 1 based on an operation condition of the air conditioner and a running condition of the vehicle 5 except for the air conditioner.

Figure 2:
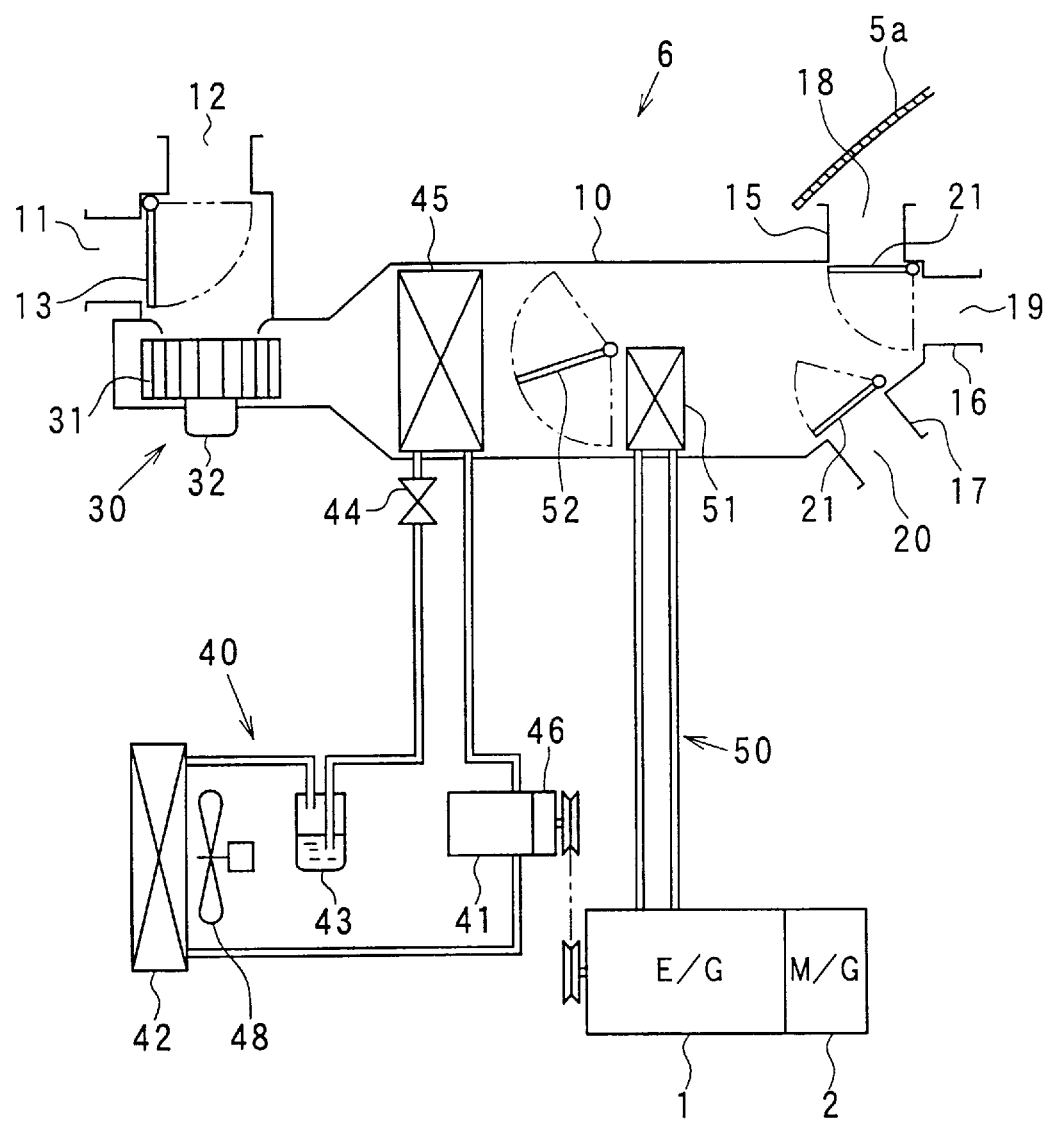
FIG. 2 is a schematic diagram showing an entire structure of an air conditioner mounted on the hybrid vehicle in FIG. 1.

As shown in FIG. 2, the air conditioning unit 6 is constructed by an air conditioning duct 10, a centrifugal type blower 30, a refrigerant cycle system 40, a cooling water circuit 50 and the like. The air conditioning duct 10 defines an air passage through which air is introduced into the passenger compartment of the vehicle 5. The centrifugal type blower 30 generates an air flow in the air conditioning duct 10, and the refrigerant cycle system 40 cools air flowing in the air conditioning duct 10 so as to cool the passenger compartment. The cooling water circuit 50 heats air flowing in the air conditioning duct 10 so as to heat the passenger compartment.

The air conditioning duct 10 is disposed in the passenger compartment of the vehicle 5 at a front side. An inside/outside air switching box (air-suction port switching box) is provided in the air conditioning duct 10 at the most upstream air side. The inside/outside air switching box includes an inside air suction port 11, through which air (inside air) inside the passenger compartment is introduced, and an outside air suction port 12 through which air (outside air) outside the passenger compartment is introduced. An inside/outside air switching damper (suction port switching damper) 13 is rotatably attached to the inside/outside air switching box, inside the inside air suction port 11 and the outside air suction port 12. The inside/outside air switching damper 13 is driven by an actuator 14 such as a servomotor shown in FIG. 3, to selectively switch an air suction mode among an inside air circulation mode, an outside air suction mode and the like.

An air outlet switching box is provided in the air conditioning duct 10 at the most downstream air side. The air outlet switching box includes a defroster opening portion, a face opening portion and a foot opening portion. A defroster duct 15 is connected to the defroster opening portion, and a defroster air outlet 18, from which warm air is mainly blown toward an inner surface of a windshield 5a, is opened at a downstream end of the defroster duct 15. A face duct 16 is connected to the face opening portion, and a face air outlet 19, through which cool air is mainly blown toward the upper half body of a passenger, is opened at a downstream end of the face duct 16. A foot duct 17 is connected to the foot opening portion, and a foot air outlet 20, through which warm air is mainly blown toward the foot portion of the passenger, is opened at the downstream end of the foot duct 17.

Two air outlet switching dampers 21 are rotatably attached to the air conditioning duct 10 inside the air outlets 18–20. The air outlet switching dampers 21 are driven by actuators 22 such as servomotors and the likes in FIG. 3, and switch one air outlet mode, among a face mode, a bi-level mode, a foot mode, a foot/defroster mode and a defroster mode. All of conditioned air is blown from the face air outlet 19 in the face mode, and the conditioned air is blown from the face air outlet 19 and the foot air outlet 20 in the bi-level mode. In the foot mode, a large amount (about 80%) of the conditioned air is blown from the foot air outlet 20 and a remainder thereof is blown from the defroster air outlet 18. In the foot/defroster mode, about 40% (at least ⅓) of the conditioned air is blown from the defroster air outlet 18 and the remainder thereof is blown from the foot air outlet 20. In the defroster mode, all of the conditioned air is blown from the defroster air outlet 18.

The centrifugal type blower 30 includes a centrifugal fan 31 and a blower motor 32 for driving the centrifugal fan 31. The centrifugal fan 31 is rotatably disposed in a scroll case integrated with the air conditioning duct 10. An air blowing amount (rotation speed of the centrifugal fan 31) blown by the blower 30 is controlled based on a voltage (blower voltage) applied to the blower motor 32 through a blower driving circuit 33 in FIG. 3.

The refrigerant cycle system 40 is constructed by the compressor 41, a condenser 42, a receiver 43, an expansion valve 44, an evaporator 45, refrigerant pipes for connecting them in annular. The compressor 41 is driven by the engine 1 through a belt to compress refrigerant, and the condenser 42 condenses and liquefies the compressed refrigerant from the compressor 41. The receiver 43 separates the condensed and liquefied refrigerant into liquid refrigerant and gas refrigerant, and only liquid refrigerant is introduced into the expansion valve 44. The expansion valve 44 decompresses and expands the liquid refrigerant from the receiver 43, and the evaporator 45 evaporates the decompressed refrigerant from the expansion valve 44.

The evaporator 45 is disposed in the air conditioning duct 10 so as to cross all sectional area of the air passage of the air conditioning duct 10. The evaporator 45 is an interior heat exchanger disposed in the passenger compartment, for cooling and dehumidifying air passing therethrough. That is, the evaporator 45 is a cooling heat exchanger for cooling and dehumidifying air using the operation of the compressor 41. A solenoid clutch 46 (electromagnetic clutch) is connected to the compressor 41, for transmitting and interrupting the rotation force from the engine 1 to the compressor 41. The solenoid clutch 46 is controlled by a clutch driving circuit 47 in FIG. 3.

When the solenoid clutch 46 is turned on, the motive force of the engine 1 is transmitted to the compressor 41, and air in the air conditioning duct 10 is cooled by the evaporator 45. At this time, an amount of refrigerant discharged from the discharge port of the compressor 41 is changed proportionally to the rotation speed of the engine 1. When the solenoid clutch 46 is deenergized, the engine 1 and the compressor 41 are disconnected from each other, and the cooling-air operation of the evaporator 45 is stopped. The condenser 42 is disposed at a position where a contrary wind (outside air) can be readily received when the vehicle 5 runs. The condenser 42 is an exterior heat exchanger where refrigerant, flowing in the refrigerant cycle system 40, is heat-exchanged with outside air blown by a cooling fan 48.

The cooling water circuit 50 is a water circuit where cooling water, heated by a water jacket of the engine 1, is circulated by a water pump (not shown). The cooling water circuit 50 includes a radiator (not shown), a thermostat (not shown) and a heater core 51. The cooling water, after cooling the engine 1, flows through the heater core 51.

Therefore, the heater core 51 heats air flowing therethrough, using the cooling water as a heating source. The heater core 51 is disposed in the air conditioning duct 10 at a downstream air side of the evaporator 45 to form a bypass air passage through which air passing through the evaporator 45 bypasses the heater core 51. An air mixing damper 52 is rotatably disposed at an upstream air side of the heater core 51. The air mixing damper 52, driven by an actuator 53 such as a servomotor, adjusts a ratio between an air amount flowing through the heater core 51 and an air amount bypassing the heater core 51, so that the temperature of air to be blown into the passenger compartment is adjusted.

Next, a control system according to the present embodiment will be described with reference to FIGS. 1, 3, 4. Into the air-conditioning ECU 7, communication signals from the engine ECU 9, switch signals from switches provided on a control panel P and sensor signals from sensors are input. The air-conditioning ECU 7 controls the operation of the air conditioner, and outputs predetermined signals to the engine ECU 9 based on the air conditioning condition.

Figure 4:
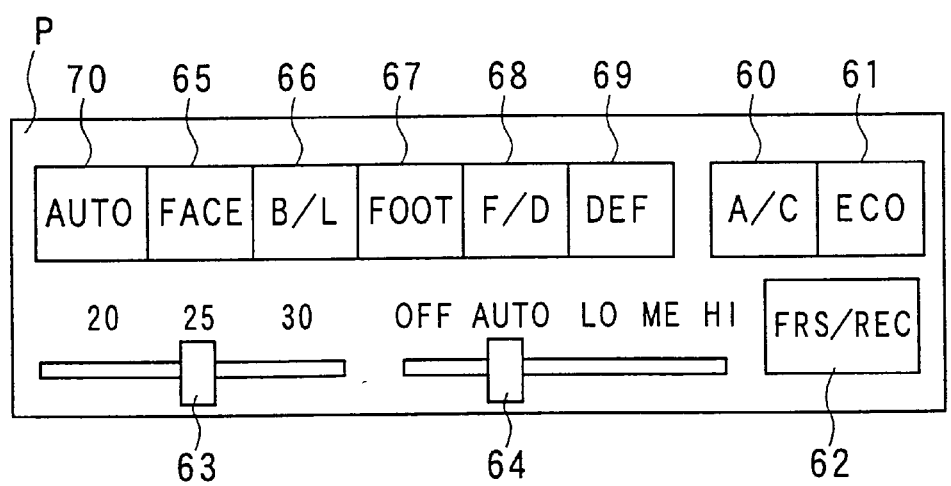
FIG. 4 is a plan view showing a control panel shown in FIG. 3.

As shown in FIG. 4, an air-conditioning (A/C) switch 60, an economy (ECO) switch 61, a suction-port changing over switch 62, a temperature setting lever 63, an air amount changing over switch 64, air-outlet mode selecting switches and the like are provided on the control panel P.

The A/C switch 60 is a switch for operating the air conditioner, that is, a switch for commanding the operation or the stop of the air conditioner. Further, the A/C switch 60 is a switch for commanding a cool mode where an amenity in the passenger compartment is mainly considered. The ECO switch 61 is a switch for commanding an economy mode where an economy property of fuel consumption is mainly considered. In the economy mode, a cooling degree of air, cooled by using the evaporator 45, is set higher than that in the cool mode. Specifically, in the cool mode, a temperature (ON temperature), at which operation of the compressor 41 is started, is 4° C., and a temperature (OFF temperature), at which the compressor 41 is stopped, is 3° C. On the other hand, in the economy mode, the ON temperature for driving the compressor 41 is 13° C., and the OFF temperature for stopping the compressor 41 is 12° C.

The suction-port changing over switch 62 switches an air suction mode, and the temperature setting lever 63 sets the temperature in the passenger compartment at a requested temperature. The air-amount changing over switch 64 is operated to one of an OFF position, an AUTO position, a LO position, a ME position and a HI position, so that the air amount blown by the centrifugal fan 31 is adjusted. The electrical power supplied to the blower motor 32 is stopped at the OFF position, and the blower voltage (voltage applied to the blower motor 32) is automatically controlled at the AUTO position. At the LO position of the air-amount changing over switch 64, the blower voltage is set at the lowest voltage so that the air amount blown by the centrifugal fan 31 is set at a smallest amount. At the ME position of the air-amount changing over switch 64, the blower voltage is set at a middle voltage so the air amount blown by the centrifugal fan 31 is set at a middle amount. At the HI position of the air-amount changing over switch 64, the blower voltage is set at the highest voltage so the air amount blown by the centrifugal fan 31 is set at a largest amount.

The air-outlet mode selecting switches include a face (FACE) switch 65 for setting a face (FACE) mode, a bi-level (B/L) switch 66 for setting a bi-level (B/L) mode, a foot (FOOT) switch 67 for setting a foot (FOOT) mode, a foot/defroster (F/D) switch 68 for setting a foot/defroster (F/D) mode, a defroster (DEF) switch 69 for setting a defroster (DEF) mode and an AUTO switch 70 for automatically controlling the air outlet mode (an AUTO mode).

Figure 3:
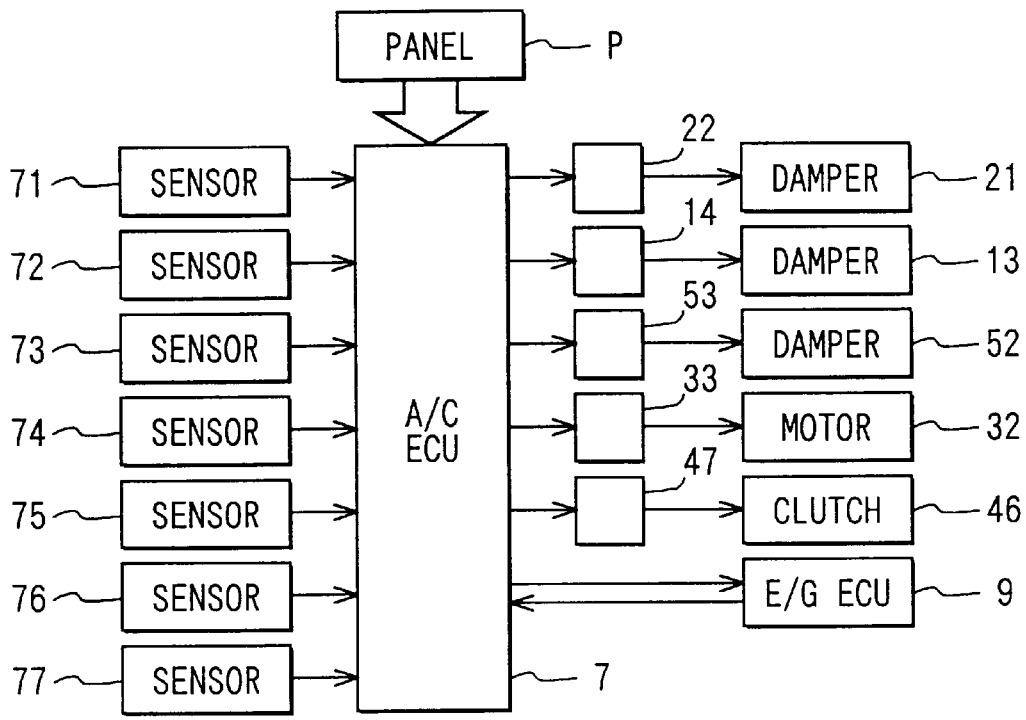
FIG. 3 is a block diagram showing a control system of the air conditioner shown in FIG. 2.

As shown in FIG. 3, an inside air temperature sensor 71, an outside air temperature sensor 72, a solar radiation sensor 73, a post-evaporator temperature sensor 74, a water temperature sensor 75, a vehicle speed sensor 76, a humidity sensor 77 and the like are provided. The inside air temperature sensor 71 detects an air temperature in the passenger compartment, and the outside air temperature sensor 72 detects an air temperature outside the passenger compartment. The solar radiation sensor 73 detects an amount of sunlight radiated into the passenger compartment. The post-evaporator temperature sensor 74 is disposed immediately after the evaporator 45 at the downstream air side, to detect a temperature of air immediately after flowing through the evaporator 45 (post-evaporator air temperature TE), that is, a temperature of air cooled by the evaporator 45. The water temperature sensor 75 detects a temperature of cooling water flowing into the heater core 51, and the vehicle speed sensor 76 detects a speed of the vehicle 5. The humidity sensor 77 is disposed around the windshield 5a in the passenger compartment to detect a relative humidity on the inner surface of the windshield 5a. The humidity sensor 77 generates a voltage proportional to the relative humidity on the inner surface of the windshield 5a.

Next, control operation of the air-conditioning ECU 7 will be now described with reference to FIGS. 5–9. The air-conditioning ECU 7 includes a microcomputer (not shown) constructed by a central processing unit (CPU), a read only memory (ROM), a random access memory (RAM) and the like.

Sensor signals from the sensors 71–75 are converted from analog signals to digital signals by an input circuit (not shown) within the air-conditioning ECU 7. Thereafter, the digital signals are inputted into the microcomputer.

Figure 5:
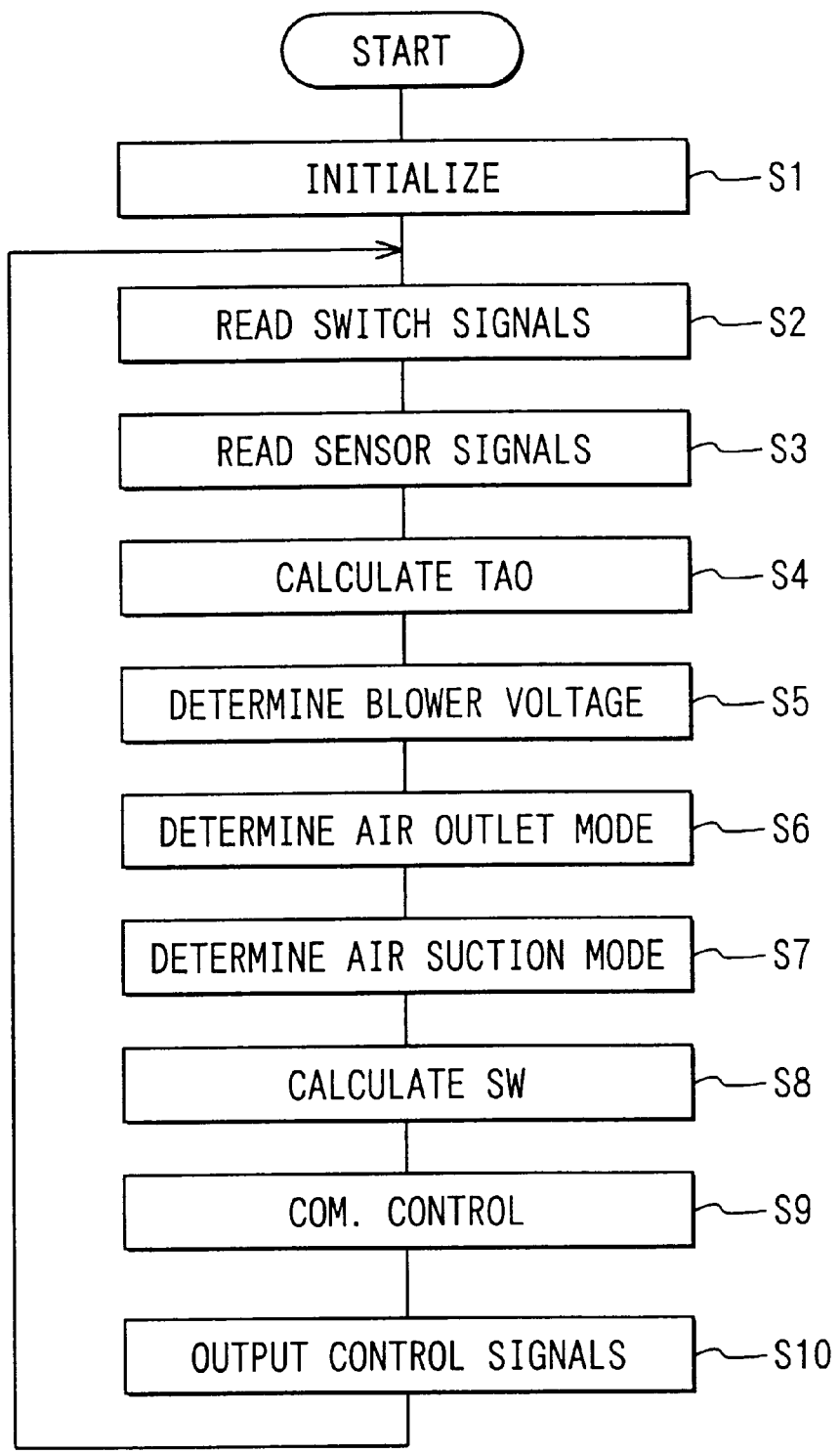
FIG. 5 is a flow diagram showing a basic control of an air-conditioning ECU according to the embodiment.
Figure 6:
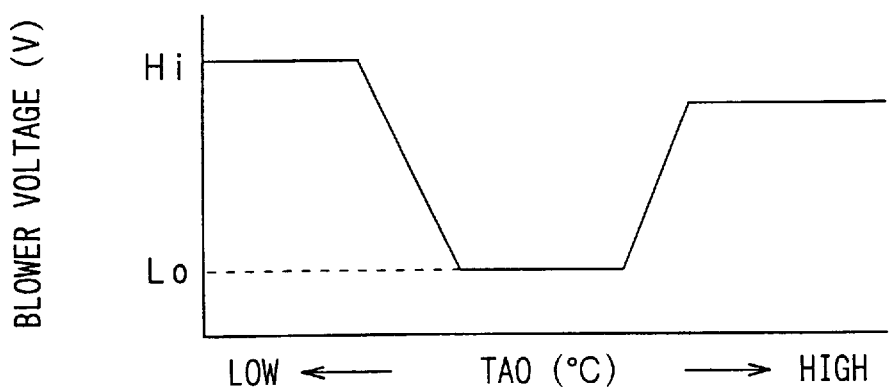
FIG. 6 is a characteristic graph showing a relationship between a target air temperature TAO and a blower voltage, according to the embodiment.

When the ignition switch is turned on, a direct-current electric power is applied to the air-conditioning ECU 7, a control routine shown in FIG. 5 is started, and initial setting is performed at step S1. At step S2, the air-conditioning ECU 7 reads the switch signals from the switches such as the temperature setting lever 63. At step S3, the air-conditioning ECU 7 reads the sensor signals from the inside air temperature sensor 71, the outside air temperature sensor 72, the solar radiation sensor 73, the post-evaporator temperature sensor 74, the water temperature sensor 75, the speed sensor 76 and the humidity sensor 77 after the sensor signals are converted from analog signals to digital signals.

At step S4, a target air temperature TAO to be blown into the passenger compartment is calculated based on the following formula (1) beforehand stored in the ROM.

$$TAO = K\text{SET} \times T\text{SET} - KR \times TR - KAM \times TAM - KS \times TS + C \qquad (1)$$

Wherein, TSET indicates a set temperature set by the temperature setting lever 63, TR indicates an inside air temperature detected by the inside air temperature sensor 71, TAM indicates an outside air temperature detected by the outside air temperature sensor 72, and TS indicates a solar radiation amount detected by the solar radiation sensor 73. KSET, KR, KAM and KS indicate gain coefficients, respectively, and C indicates a correction constant. At step S5, the blower voltage corresponding to the target air temperature TAO is determined using a characteristic view, shown in FIG. 6, beforehand stored in the ROM.

Figure 7:
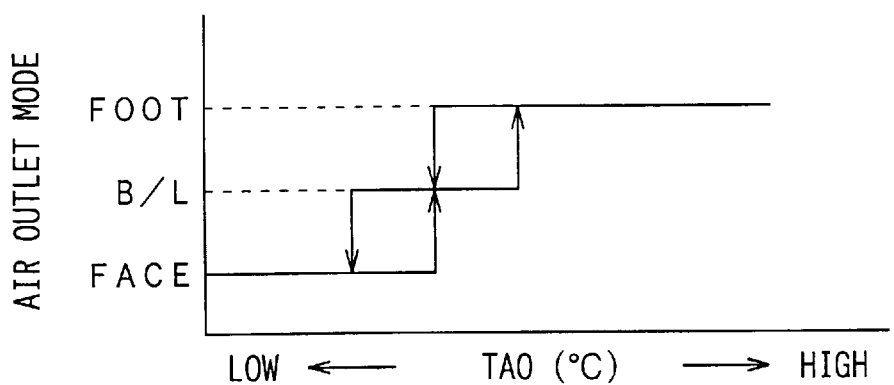
FIG. 7 is a characteristic graph showing a relationship between the target air temperature TAO and an air outlet mode, according to the embodiment.
Figure 8:
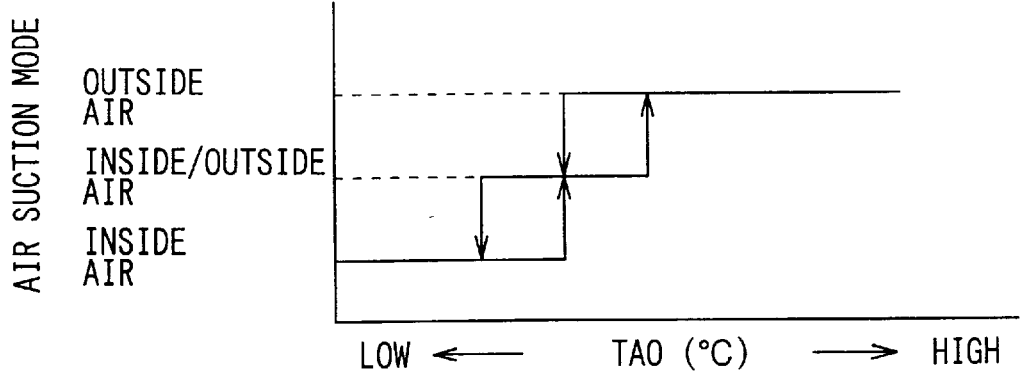
FIG. 8 is a characteristic graph showing a relationship between the target air temperature TAO and an air suction mode, according to the embodiment.

When the AUTO mode is selected by turning on the AUTO switch 70 on the control panel P, the air outlet mode corresponding to the target air temperature TAO is determined at step S6, by using the characteristic view shown in FIG. 7 beforehand stored in the ROM. The air outlet mode is switched from the FACE mode to the FOOT mode through the B/L mode as the target air temperature TAO increases from a lower temperature to a higher temperature. At the step S6, when any one of the air outlet changing over switches 65–69 is manually selected, the selected air outlet mode is set. At step S7, the air suction mode corresponding to the target air temperature TAO is determined using a characteristic view shown in FIG. 8, beforehand stored in the ROM.

At step S7, as the target air temperature TAO increases from the lower temperature to the higher temperature, the air suction mode is switched from an inside air circulation mode to an outside air suction mode through an inside/outside air suction mode. In the inside air circulation mode, the inside/outside air switching damper 13 is set at a position indicated by the chain line in FIG. 2, so that only inside air is sucked from the inside air suction port 11. In the inside/outside air suction mode, the inside/outside air switching damper 13 is set at an intermediate position between positions indicated by the solid line and the chain line in FIG. 2, so that the inside air and the outside air are sucked from the inside air suction port 11 and the outside air suction port 12, respectively. In the outside air circulation mode, the inside/outside air switching damper 13 is set at a position indicated by the solid line in FIG. 2, so that only outside air is sucked from the outside air suction port 12.

At step S8, a target open degree SW of the air mixing damper 52 is calculated based on the following formula (2) beforehand stored in the ROM.

$$SW=[(TAO-TE)/(TW-TE)]\times 100(\%) \qquad (2)$$

Wherein, TE indicates the post-evaporator air temperature, detected by the post-evaporator temperature sensor 74, and TW indicates a cooling water temperature detected by the water temperature sensor 75.

When it is calculated that SW≦0(%), the air mixing damper 52 is controlled to be set at a maximum cooling position where all of the cool air from the evaporator 45 bypasses the heater core 51. When it is calculated that SW≧100(%), the air mixing damper 52 is controlled to be set at a maximum heating position where all of the cool air from the evaporator 45 flows through the heater core 51. When it is calculated that 0(%)<SW<100(%), the air mixing damper 52 is controlled to be set at a position between the maximum cooling position and the maximum heating position, so that a part of the cool air from the evaporator 45 bypasses the heater core 51 and the remainder thereof flows through the heater core 51.

Figure 9:
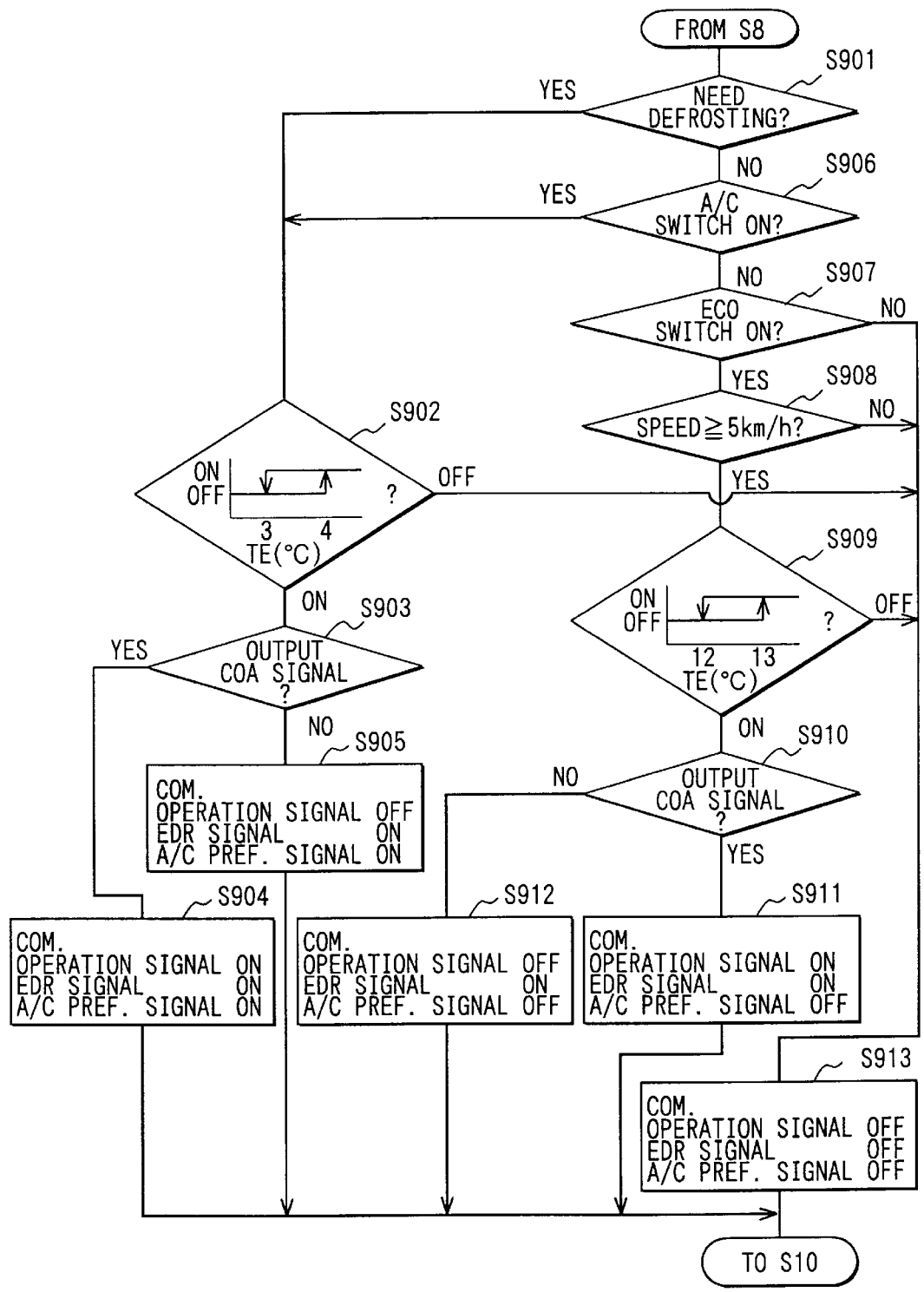
FIG. 9 is a flow diagram showing a detail control of step S9 in FIG. 5, according to the embodiment.

At step S9, a control routine shown in FIG. 9 is started, and the control state of the compressor 41 is determined. The control operation of step S9 will be described later in detail. At step S10, the air-conditioning ECU 7 outputs control signals to the actuators 14, 22, 53, the blower driving circuit 33 and the clutch driving circuit 47 so that the control conditions calculated or determined at steps S4–S9 can be obtained, respectively. Further, at the step S10, the air-conditioning ECU 7 communicates with the engine ECU 9. That is, the air-conditioning ECU 7 transmits signals to and receives signals from the engine ECU 9.

Next, the control operation at step S9 for controlling the compressor 41 will be described with reference to FIG. 9. First, at step S901, it is determined whether or not a defrosting control for preventing the windshield 5a from being frosted is need. Even when both A/C switch 60 and ECO switch 61 are turned off in a heating operation while stopping the compressor 41, it is determined whether or not the defrosting control is required at step S901. At step S901, it is determined that the defrosting control is required in the following cases.

That is, the F/D switch 68 or the DEF switch 69 is manually selected among the air-outlet changing over switches 65–69, it can be determined that the defrosting control is need. That is, when the F/D mode or the DEF mode is selected so that conditioned air is blown toward the inner surface of the windshield 5a, it is determined that the defrosting control is necessary.

Alternatively, when the relative humidity on the inner surface of the windshield 5a is equal to or higher than a predetermined value (e.g., 90% RH) when the AUTO mode is selected by turning on the AUTO switch 70, it can be determined that the defrosting control is necessary.

Even in the FOOT mode, a part (about 20% RH) of the conditioned air is blown from the defroster air outlet 18. Accordingly, in the present embodiment, when the amount of air blown from the defroster air outlet 18 is equal to or more than ⅓ of the entire air amount blown from the blower, that is, only when the F/D mode or the DEF mode is selected, the defrosting control is determined to be required.

When it is determined that the defrosting control is need at step S901, the control program moves to step S902. That is, at step S902, it is determined whether the operation of the compressor 41 is need based on the post-evaporator air temperature TE using the characteristic view of step S902 beforehand stored in the ROM. Specifically, when the post-evaporator air temperature TE increases to a first frosting limit temperature (e.g., 4° C.), the operation of the compressor 41 is determined to be required, and the compressor 41 is turned on. On the other hand, when the post-evaporator air temperature TE decreases to a second frosting limit temperature (e.g., 3° C.), it is determined that the operation of the compressor 41 is unnecessary, and the compressor 41 is turned off.

When the compressor 41 is need to be turned on at step S902, the control program proceeds to step S903. At step S903, it is determined whether or not a compressor operation authorizing signal (COA signal) for operating the compressor 41 is output from the engine ECU 9. Specifically, when it is determined that the compressor 41 can be operated, the COA signal is output from the engine ECU 9. At step S903, when the COA signal is determined to be output, that is, when the determination of step S903 is YES, the control program proceeds to step S904. At the step S904, the air-conditioning ECU 7 outputs a compressor operation signal for energizing the solenoid clutch 46 and for operating the compressor 41, and outputs an engine-driving requirement signal (EDR signal) for requiring the driving of the engine 1 to the engine ECU 9. Further, the air-conditioning ECU 7 outputs an air-conditioning preference signal (A/C pref. signal), for requiring the operation of the engine 1 irrespective of the condition of the vehicle 5 except for the air conditioner, to the engine ECU 9. When the engine ECU 9 receives only the engine-driving requirement signal (i.e., EDR signal) among the EDR signal and the air-conditioning preference signal (A/C pref. signal), the engine ECU 9 determines whether the engine 1 is driven or stopped based on the condition of the vehicle 5 except for the air conditioner.

On the other hand, when the determination is NO at step S903, the control program proceeds to step S905. At step S905, the air-conditioning ECU 7 stops energizing the solenoid clutch 46 by stopping the output of the compressor operation signal (i.e., com. operation signal), and stops operating the compressor 41. Further, at step S905, the air-conditioning ECU 7 outputs the engine-driving requirement signal (i.e., EDR signal) and the air-conditioning preference signal (A/C pref. signal), to the engine ECU 9.

Next, when the determination of step S901 is NO, that is, when the defrosting control is unnecessary, the control program proceeds to step S906. At step S906, it is determined whether or not the A/C switch 60 is turned on. When the determination at step S906 is YES, the above-described controls at steps S902–S905 are performed. When the determination is NO at step S906, it is determined whether or not the ECO switch 61 is turned on at step S907. When the ECO switch 61 is turned on at step S907, it is determined whether the vehicle 5 is in running at step 908. Specifically, when the speed of the vehicle 5 detected by the vehicle speed sensor 76 is equal to or higher than a predetermined speed (e.g., 5 km/h), it is determined that the vehicle 5 is running, and the determination is YES at step S908.

Next, at step S909, it is determined whether or not the operation of the compressor 41 is need based on the post-evaporator air temperature TE in accordance with a characteristic view of step S909 beforehand stored in the ROM.

Specifically, when the post-evaporator air temperature TE increases to a first starting temperature (e.g., 13° C.), the operation of the compressor 41 is determined to be need, and ON signal for operating the compressor 41 is output at step S909. When the post-evaporator air temperature TE decreases to a first stopping temperature (e.g., 12° C.), it is determined that the operation of the compressor 41 is unnecessary, and OFF signal for stopping the operation of the compressor 41 is output at step S909.

When the compressor 909 is need to be turned ON at step S909, it is determined whether or not the compressor-operation authorizing signal (i.e., COA signal) is output from the engine ECU 9 at step S910. When the COA signal is determined to be output from the engine ECU 9, that is, when the determination is YES at step S910, the control program proceeds to step S911. At step S911, the air-conditioning ECU 7 outputs the compressor operation signal (Com. operation signal), and outputs the engine-driving requirement signal (i.e., EDR signal) to the engine ECU 9, but stops the output of the air-conditioning preference signal (A/C pref. signal) to the engine ECU 9.

On the other hand, when the determination is NO at step S910, the control program proceeds to step S912. At step S912, the air-conditioning ECU 7 outputs the engine-driving requirement signal (i.e., EDR signal), but stops the output of the compressor operation signal (i.e., com. operation signal) and the air-conditioning preference signal (i.e., A/C pref. signal).

When the determination is NO at steps S907, S908, or when the compressor 41 is not need to be turned ON (OFF signal) at steps S902, S909, control program proceeds to step S913. At step S913, the air-conditioning ECU 7 stops the output of the compressor operation signal (i.e., com. operation signal), the output of the engine-driving requirement signal (i.e., EDR signal), and the output of the air-conditioning preference signal (i.e., A/C pref. signal).

Next, the control processes of the engine ECU 9 according to the present embodiment will be now described with reference to FIG. 10. The engine ECU 9 reads sensor signals from sensors for detecting the operation condition of the vehicle 5, communication signals from the air-conditioning ECU 7 and the hybrid ECU 8. An engine rotation speed sensor (not shown), a throttle open degree sensor (not shown), a battery voltage sensor (not shown), the water temperature sensor 75, the vehicle speed sensor 76 and the like are used as the sensors for detecting the operation condition of the vehicle 5. The engine ECU 9 includes a microcomputer (not shown) composed of a CPU, a ROM, a RAM and the like. Sensor signals from the sensors are converted from analog signals to digital signals by an input circuit (not shown) within the engine ECU 9. Thereafter, the digital signals are inputted into the microcomputer.

Figure 10:
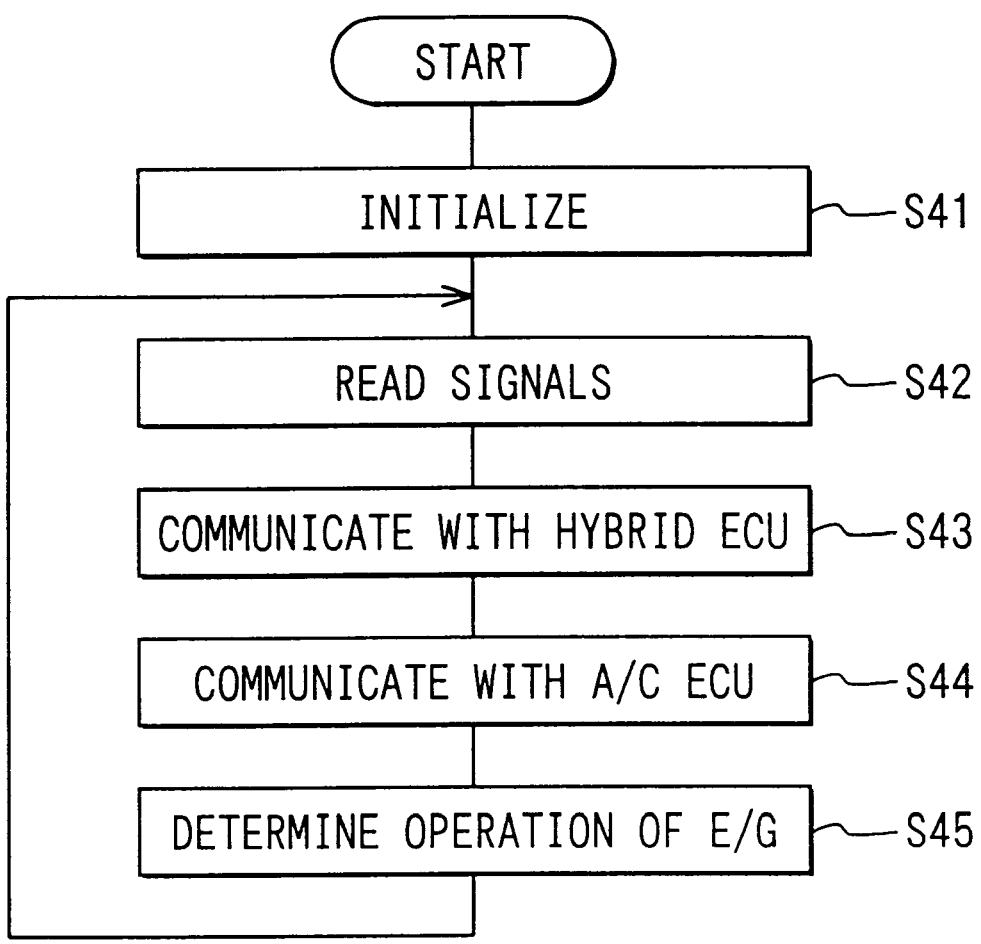
FIG. 10 is a flow diagram showing a basic control of an engine ECU in FIG. 1, according to the embodiment.

When the ignition switch is turned on, a directcurrent electric power is applied to the engine ECU 9, and a control routine shown in FIG. 10 is started. First, at step S41, initial setting is performed. At step S42, the engine ECU 9 reads the sensor signals from the engine rotation speed sensor, the throttle open degree sensor, the battery voltage sensor, the water temperature sensor 75 and the vehicle speed sensor 76. At step S43, the engine ECU 9 performs communications with the hybrid ECU 8. That is, the signals are transmitted from the engine ECU 9 to the hybrid ECU 8, and are received to the engine ECU 9 from the hybrid ECU 8. At step S44, the engine ECU 9 performs communications with the air-conditioning ECU 7. At step S45, it is determined whether or not the engine 1 is operated based on the sensor signals.

Figure 11:
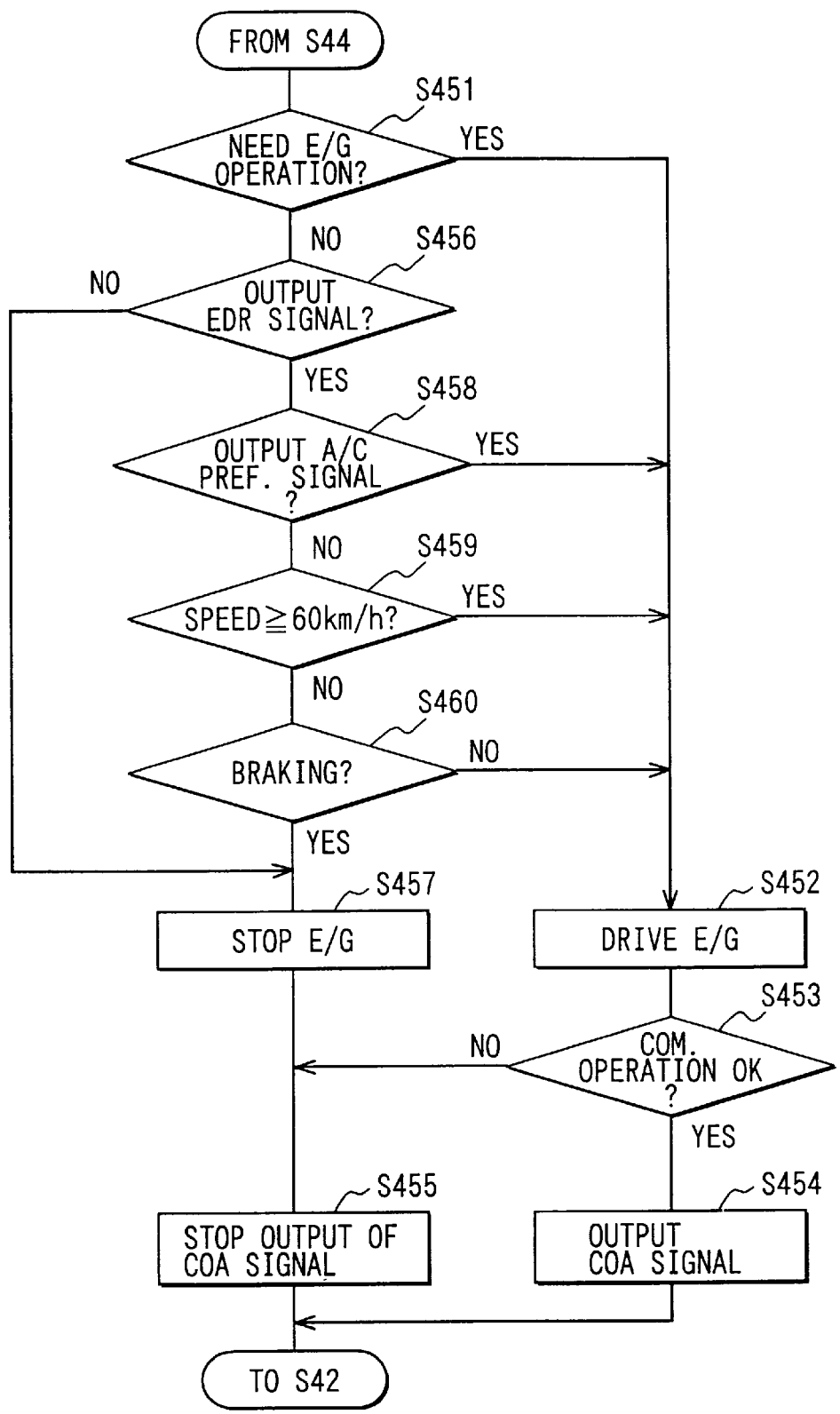
FIG. 11 is a flow diagram showing a detail control of step S45 in FIG. 10, according to the embodiment.

Next, detail control at the step S45 will be now described with reference to FIG. 11.

When the throttle open degree detected by the throttle open degree sensor is large and a large driving force is required (i.e., in a high-load running mode), or when a voltage of the battery 4 detected by the battery voltage sensor is equal to or smaller than a predetermined voltage, that is, when the battery 4 is need to be charged by the generator, it is determined that the engine 1 is need to be driven at step S451. When the determination is YES at the step S451, the engine ECU 9 outputs a control signal to the engine-starting unit 3 so that operation of the engine 1 is started by the engine-starting unit 3.

Next, at step 453, it is determined whether or not it is possible to operate the compressor 41 based on the operation condition of the engine 1 (engine output and engine load). When it is determined that it possible to operate the compressor 41 without a problem, the determination of step S453 is YES, and the control program proceeds to step S454.

At step S454, the engine ECU 9 outputs the compressor-operation authorizing signal (i.e., COA signal). When the determination is NO at step S453, the engine ECU 9 stops the output of the COA signal at step S455. That is, at step S455, the COA signal is not output.

When the vehicle 5 stops or runs in a low load condition while the voltage of the battery 4 exceeds the above predetermined voltage, the determination of step S451 is NO, and the control program proceeds to step S456. At step S456, it is determined whether or not the engine-driving requirement signal (i.e., EDR signal) is output from the air-conditioning ECU 7. When the EDR signal is not output at step S456, the determination of step S456 is NO, and the control program proceeds to step S457. At step S457, the engine ECU 9 outputs a control signal to the engine-starting unit 3 so that the engine 1 is stopped.

When the EDR signal is output from the air-conditioning ECU 7, the determination at step S456 is YES, and it is determined whether or not the air-conditioning preference signal (i.e., A/C pref. signal) is output at step S458. When the air-conditioning preference signal (i.e., A/C pref. signal) is output at step S458, operation of the engine 1 is started at step S452. That is, when the air-conditioning preference signal (i.e., A/C pref. signal) is output, the engine 1 is started irrespective of the condition of the vehicle 5 except the air conditioner.

On the other hand, when the air-conditioning preference signal (i.e., A/C pref. signal) is not output, that is, when only the EDR signal is output among the EDR signal and the air-conditioning preference signal (i.e., A/C pref. signal), the determination of step S458 is NO. Next, at steps S459, S460, it is determined whether or not a predetermined running condition is satisfied in the vehicle 5. That is, the operation of the engine 1 is started when the predetermined condition is satisfied. On the other hand, the operation of the engine 1 is stopped when the predetermined running condition is unsatisfied.

Specifically, when the speed of the vehicle 5 is equal to or higher than 60 km/h st step S459, it is determined that the vehicle is in predetermined running condition, and the operation of the engine 1 is started at step S452. Further, at the step S460, when no braking operation is performed, it is determined that the predetermined running condition is satisfied in the vehicle 5 even when the determination at step S459 is NO. When no braking operation is performed at step S460, the operation of the engine 1 is started. When the vehicle speed is lower than 60 km/h at step S459 and when the braking operation is performed at step S460, that is, when the vehicle speed is reduced in a relatively low speed area, it is determined that the predetermined running condition is not satisfied. In this case, the operation of the engine 1 is stopped at step S457.

Next, operation of the air conditioner according to the present embodiment will be now described with reference to FIGS. 1–11.

When the A/C switch 60 or the ECO switch 61 is turned on, the compressor 41 is controlled to be driven or stopped so that the post-evaporator air temperature TE becomes the predetermined temperature. Air, introduced into the air conditioning duct 10, is cooled while passing through the evaporator 45, and is heated while passing through the heater core 51, so that the temperature of air to be blown into the passenger compartment is adjusted to the target air temperature TAO. Thus, the temperature in the passenger compartment is controlled at the set temperature TSET set by the temperature setting lever 63.

When the ECO switch 61 is turned on and when defrosting control is not performed, the operation state of the compressor 41 is controlled so that the post-evaporator air temperature TE becomes relatively high (e.g., 12–13° C.). Therefore, in this case, the operation frequency of the compressor 41 becomes lower, the operation load of the compressor 41 is reduced, and fuel consumption efficiency of the engine 1 is improved. As shown at steps S908, S913 in FIG. 9, in a case where the ECO switch 61 is turned on and the defrosting control is not performed, when the vehicle speed is lower than 5 km/h (vehicle is determined to be stopped), the compressor 41 is stopped. Therefore, in this case, the fuel consumption efficiency of the engine 1 can be improved.

As shown at steps S911–S913 in FIG. 9, in the case where the ECO switch 61 is turned on and the defrosting control is not performed, the air-conditioning preference signal (A/C Pref. signal) is not output. Therefore, in this case, it is determined whether or not the engine 1 is driven based on the condition of the vehicle 5 except for the air conditioner, as shown at steps S458–S460 in FIG. 11. That is, when the vehicle speed is reduced in the relatively low speed area or the vehicle 5 is stopped, the engine 1 is stopped. Therefore, it can prevent the engine 1 from being driven only for operating the compressor 41, thereby improving the fuel consumption efficiency.

When it is determined that the defrosting operation is need at the step S901, that is, when the F/D switch 68 or the DEF switch 69 is manually selected, or when the relative humidity on the inner surface of the windshield 5a is equal to or higher than the predetermined value, the operation of the compressor 41 is controlled so that the post-evaporator air temperature TE becomes 3–4° C. as shown at step S902 in FIG. 9. In this case, the post-evaporator air temperature TE is controlled to be lower than that in the case where the ECO switch 61 is turned on and the defrosting control is not performed, thereby increasing dehumidifying capacity and improving defrosting performance.

When the defrosting control is determined to be required at the step S901, the operation of the compressor 41 is automatically started even when both of the A/C switch 60 and the ECO switch 61 are turned off. Then, air to be conditioned is dehumidified, thereby improving defrosting performance.

As shown at steps S904, S905 in FIG. 9, when the defrosting control is performed, the A/C preference signal is output. Therefore, as shown at steps S458, S452 in FIG. 11, the engine 1 is driven irrespective of the condition of the vehicle 5 except for the air conditioner. Accordingly, the compressor 41 can be driven irrespective of the condition of the vehicle 5, and the defrosting function of the air conditioner can be sufficiently obtained.

As shown at steps S904, S905 in FIG. 9, when the A/C switch 60 is turned on, the A/C preference signal is output. Therefore, as shown at steps S906, S902 in FIG. 9, the post-evaporator air temperature TE is controlled to be lower while the compressor 41 can be operated irrespective of the condition of the vehicle 5. Accordingly, the control where an amenity in the passenger compartment is mainly considered is performed, and the amenity in the passenger compartment can be improved.

Although the present invention has been fully described in connection with the preferred embodiment thereof with reference to the accompanying drawings, it is to be noted that various changes and modifications will become apparent to those skilled in the art.

For example, in the above-described embodiment of the present invention, the humidity sensor 77, for detecting the relative humidity on the inner surface of the windshield 5a, is disposed around the windshield 5a. However, the humidity sensor 77 may be disposed below a vehicle instrument panel. Even in this case, the relative humidity on the inner surface of the windshield 5a can be estimated as follows. That is, the temperature of the windshield 5a is estimated based on the outside air temperature TAM while the vehicle speed and the solar radiation amount are considered. Further, the relative humidity on the inner surface of the windshield 5a is estimated using the estimated temperature of the windshield 5a, the inside air temperature TR and the relative humidity in the passenger compartment detected by the humidity sensor 77. Then, the determination of step S901 can be performed based on the estimated relative humidity, so that the same control as in the above embodiment can be performed.

Further, the relative humidity in the passenger compartment can be controlled at a comfortable relative humidity using the information of the relative humidity in the passenger compartment detected by the humidity sensor 77. Specifically, when the detected relative humidity in the passenger compartment exceeds a first target relative humidity (e.g., about 60% RH), the dehumidifying capacity in the evaporator is increased by controlling the operation of the compressor 41 so that the post-evaporator air temperature TE becomes lower. When the detected relative humidity decreases lower than a second target relative humidity (e.g., about 50% RH), the operation of the compressor 41 is controlled so that the post-evaporator air temperature TE becomes higher. As in this manner, the relative humidity in the passenger compartment can be maintained around the target relative humidity (between the first and second relative humidities) by changing the post-evaporator air temperature TE in accordance with the actual relative humidity in the passenger compartment.

In the above-described embodiment of the present invention, the hybrid ECU 8 is connected to the engine ECU 9 while the air-conditioning ECU 7 is connected to the engine ECU 9. However, the hybrid ECU 8 may be connected to the engine ECU 9 while the air-conditioning ECU 7 is connected to the hybrid ECU 8. In this case, the control processes, performed by the engine ECU 9 in the above embodiment, may be performed by the hybrid ECU 8.

Further, the air-conditioning ECU 7, the hybrid ECU 8 and the engine ECU 9 may be connected to each other through a local area network (LAN) and the like. In this case, all of the control processes, performed by the three ECUs 7, 8, 9 in the above embodiment, may be performed by any one of the three, or may be divided into the three.

Further, the air-conditioning ECU 7, the hybrid ECU 8 and the engine ECU 9 may be integrated to a single ECU, and the air conditioner, the engine 1 and the electric motor 2 may be controlled by the single ECU.

Such changes and modifications are to be understood as being within the scope of the present invention as defined by the appended claims.

What is claimed is:

1. An air conditioner for a hybrid vehicle, the hybrid vehicle having an engine for running the vehicle, an electric motor for running the vehicle, and an engine controller for controlling an operation of the engine, the air conditioner comprising:
   a compressor for compressing and discharging refrigerant, the compressor being driven by the engine;
   a cooling heat exchanger for cooling and dehumidifying air to be blown into a passenger compartment of the vehicle, by an operation of the compressor; and
   a control unit for controlling the operation of the compressor, wherein:
   the control unit outputs an air-conditioning preference signal to the engine controller for requiring driving of the engine in a defrosting control where air cooled and dehumidified by the cooling heat exchanger is blown toward a windshield of the vehicle, and an engine-driving requirement signal for requiring driving of the engine when air-conditioning operation of the cooling heat exchanger is performed by driving the compressor; and
   a requiring degree of the air-conditioning preference signal for driving the engine is larger than a requiring degree of the engine-driving requirement signal for driving the engine.

2. The air conditioner according to claim 1, wherein the defrosting control is performed when a relative humidity on an inner surface of the windshield becomes equal to or higher than a predetermined value.

3. The air conditioner according to claim 1, wherein:
   the control unit sets one of a cooling mode where the cooling heat exchanger has a predetermined cooling/dehumidifying capacity while an amenity of the passenger compartment is mainly considered, and an economy mode where the cooling heat exchanger has a cooling/dehumidifying capacity lower than the predetermined cooling/dehumidifying capacity;
   when the cooling mode is selected by the control unit, the air-conditioning preference signal is output to the engine controller; and
   when the economy mode is selected by the control unit, the engine-driving requirement signal is output to the engine controller.

4. The air conditioner according to claim 3, further comprising:
   an air conditioning switch for setting the cooling mode; and
   an economy switch for setting the economy mode, wherein:
   when the control unit determines that the defrosting control is need, the control unit automatically starts the operation of the compressor even when both the air conditioning switch and the economy switch are turned off.

5. The air conditioner according to claim 1, wherein the compressor is driven by the engine, when the control unit outputs the air-conditioning preference signal to the engine controller.

6. The air conditioner according to claim 1, wherein:
   when the economy mode is performed in a control except for the defrosting control, the control unit stops the output of the air-conditioning preference signal to the engine controller when it is determined that the vehicle is in a stopping state.

7. The air conditioner according to claim 1, wherein:
   the air-conditioning preference signal is for requiring driving of the engine irrespective of a vehicle condition; and
   when the engine controller receives the air-conditioning preference signal, the engine is operated irrespective of the vehicle condition.

8. The air conditioner according to claim 1, wherein:
   when the engine controller receives the air-conditioning preference signal, operation possibility of the engine is larger as compared with a case where the engine controller receives the engine-driving requirement signal without receiving the air-conditioning preference signal.

9. A hybrid vehicle comprising:
   an engine for running the vehicle;
   an electric motor for running the vehicle;
   an air conditioner including a compressor driven by the engine for compressing and discharging refrigerant, and a cooling heat exchanger for cooling and dehumidifying air to be blown into a passenger compartment of the vehicle by an operation of the compressor;
   an air-conditioning controller for controlling operation of the compressor; and
   an engine controller for controlling an operation of the engine based on a condition of the air conditioner and a condition of the vehicle except the air conditioner, wherein:
   the air-conditioning controller outputs an air-conditioning preference signal to the engine controller for requiring driving of the engine in a defrosting control where air cooled and dehumidified by the cooling heat exchanger is blown toward a windshield of the vehicle, and an engine-driving requirement signal for requiring driving of the engine when air-conditioning operation of the cooling heat exchanger is performed by driving the compressor; and a requiring degree of the air-conditioning preference signal for driving the engine is larger than a requiring degree of the engine-driving requirement signal for driving the engine.

10. The hybrid vehicle according to claim 9, wherein the defrosting control is performed when a relative humidity on an inner surface of the windshield becomes equal to or higher than a predetermined value.

11. The hybrid vehicle according to claim 9, wherein:

the engine controller drives the engine irrespective of the condition of the vehicle when the engine controller receives the air-conditioning preference signal from the air-conditioning controller.

12. The hybrid vehicle according to claim 11, wherein:

when the engine controller receives only the engine-driving requirement signal among the engine driving requirement signal and the air-conditioning preference signal, the engine controller drives the engine when a predetermined condition is satisfied in the vehicle, and the engine controller stops the engine when the predetermined condition is not satisfied in the vehicle.

13. The hybrid vehicle according to claim 12, wherein the predetermined condition is any one of a first condition where a vehicle speed is equal to or higher than a predetermined speed, and a second condition where the vehicle speed is lower than the predetermined speed without a braking operation.

14. The hybrid vehicle according to claim 11, wherein:

the air-conditioning controller includes an air conditioning switch for setting a cooling mode where the cooling heat exchanger has a predetermined cooling dehumidifying capacity, and an economy switch for setting an economy mode where the cooling heat exchanger has a cooling/dehumidifying capacity lower than the predetermined cooling/dehumidifying capacity; and when the air-conditioning controller determines that the defrosting control is need, the air-conditioning preference signal is output to the engine controller even when both the air conditioning switch and the economy switch are turned off.

15. The hybrid vehicle according to claim 1, wherein:

when the economy mode is performed in a control except for the defrosting control, the air-conditioning controller stops the output of the air-conditioning preference signal to the engine controller.

16. The hybrid vehicle according to claim 7, wherein:

when the engine controller receives the air-conditioning preferences signal, operation possibility of the engine is larger as compared with a case where the engine controller receives the engine-driving requirement signal without receiving the air-conditioning preference signal.

* * * * *